United States Patent [19]

Hanover et al.

[11] Patent Number: 4,484,599

[45] Date of Patent: Nov. 27, 1984

[54] PINCH-TYPE PRESSURE- OR FLOW-REGULATING VALVE

[75] Inventors: Barry K. Hanover; Stephen C. Jacobsen, both of Salt Lake City, Utah

[73] Assignee: Organon Teknika Corporation, Oklahoma City, Okla.

[21] Appl. No.: 535,356

[22] Filed: Sep. 23, 1983

[51] Int. Cl.³ .......................... F16K 7/06; F17D 3/01
[52] U.S. Cl. .................. 137/636.1; 137/595; 137/863; 137/870; 251/4; 251/6
[58] Field of Search ............ 137/595, 636.1, 863, 137/870, 862; 251/4, 6, 7, 9

[56] References Cited

U.S. PATENT DOCUMENTS

| 2,985,192 | 5/1961 | Taylor et al. | 251/7 |
| 3,411,534 | 11/1968 | Rose | 137/595 |
| 3,450,152 | 6/1969 | Ouellette | 251/9 |
| 3,895,649 | 7/1975 | Ellis | 137/595 |
| 3,918,490 | 11/1975 | Goda | 251/9 |
| 3,991,788 | 11/1976 | Kull | 137/870 |
| 4,061,142 | 12/1977 | Tuttle | 251/9 |
| 4,230,151 | 10/1980 | Jonsson | 137/595 |
| 4,282,902 | 8/1981 | Haynes | 137/636.1 |
| 4,300,552 | 11/1981 | Cannon | 251/4 |

FOREIGN PATENT DOCUMENTS 2902356  7/1980  Fed. Rep. of Germany ...... 137/595

Primary Examiner—George L. Walton
Attorney, Agent, or Firm—David M. Carter; Charles A. Wendel; Francis W. Young

[57] ABSTRACT

A pinch-type shut-off, pressure- or flow-regulating valve having a flexible tube extending through a valve body wherein the flexible tube is pinched off by the action of an eccentric cam attached to a motor. As the eccentric cam is rotated the flexible tube can be pinched off as it presses against the opposing wall inside the valve body. A number of positions of pinching off can be achieved and a microswitch can be available to locate the position of the eccentric cam.

17 Claims, 3 Drawing Figures

PINCH-TYPE PRESSURE- OR FLOW-REGULATING VALVE

The present invention relates to an improved pinch-type shut-off, pressure- or flow-regulating valve. More particularly, the invention relates to a pinch-type valve wherein the degree of flow therethrough can be readily controlled and monitored.

REFERENCE TO RELATED APPLICATIONS

This application is related to application Ser. No. 510,075 filed June 30, 1983 for Easy-Load Peristaltic Pump in the name of Harold D. Becker, application Ser. No. 521,244 filed Aug. 8, 1983 for Portable Recirculatory Hemodialysis Design in the names of Humphreys et al., U.S. patent application Ser. No. 535,355, filed Sept. 23, 1983 for Plug-in Manifolding System in the names of Jacobsen and Hanover.

BACKGROUND OF THE INVENTION

A pinch valve making use of a solenoid to pinch one or two flexible rubber tubes made by Brunswick-Technetics is known. A dialysis "single needle adapter" valve made by Vital Assists Inc., no longer in existence, is also known which operated in the same way as the Brunswick-Technetics valve. In this valve, a solenoid was used to activate a solenoid shaft moving transversely to the placement of the solenoid to pinch the rubber tubes in the valve. This valve however had the following drawbacks: a very large and heavy solenoid was required which in turn called for large power requirements, the valve was always on in one position, there was no feedback on the valve position through switches or other means, and there was no reasonable means of holding the valve in a partially opened position.

An electric hosecock to constrict the flow of fluid in a flexible tube is shown in U.S. Pat. No. 3,895,649 to Ellis, assigned to Delta Scientific Corporation of Lindenhurst N.Y. In this hosecock, a jaw is disposed adjacent the tubes whose flow is to be controlled, a plug is rotatably mounted in the hosecock body, and a coil spring is disposed around and secured to the plug. The spring has a straight end section and forms an arm which, when combined with one of the facing jaws, defines a channel for receiving a flexible tube. The spring arm is adapted to be engaged by an electromagnetic operator such as a solenoid. In a preferred embodiment, the spring arm extends between a pair of tubes which are disposed between a pair of facing jaws and can alternately constrict the fluid flow through one of the tubes.

GENERAL DESCRIPTION OF THE INVENTION

The present invention is directed to a pinch-type shut-off, pressure- or flow-regulating valve having a valve body with at least one hole therethrough for the placement of tubing, a flexible tube located in the hole in the valve body, an eccentric located in the valve body and adjacent the flexible tube, and a motor located at the top of the valve body which upon activation causes the eccentric to move and thereby pinch-off the flexible tube.

A plurality of tubes can be used in a uni- or multi-planar arrangement and the fluid flow or use of the valve can be monitored by a switch located at the bottom of the valve body.

The valve body can either be of one or two pieces and it is preferred to use a two-piece valve body for ease of placement of the flexible tube therethrough.

The flexible tube is preferably made of silicone elastomer and contains at its end a connector of non-flexible material.

The motor used to operate the valve can be any of a D.C. motor, a A.C. motor, or a stepping motor.

DETAILED DESCRIPTION OF THE INVENTION

Figure 1:
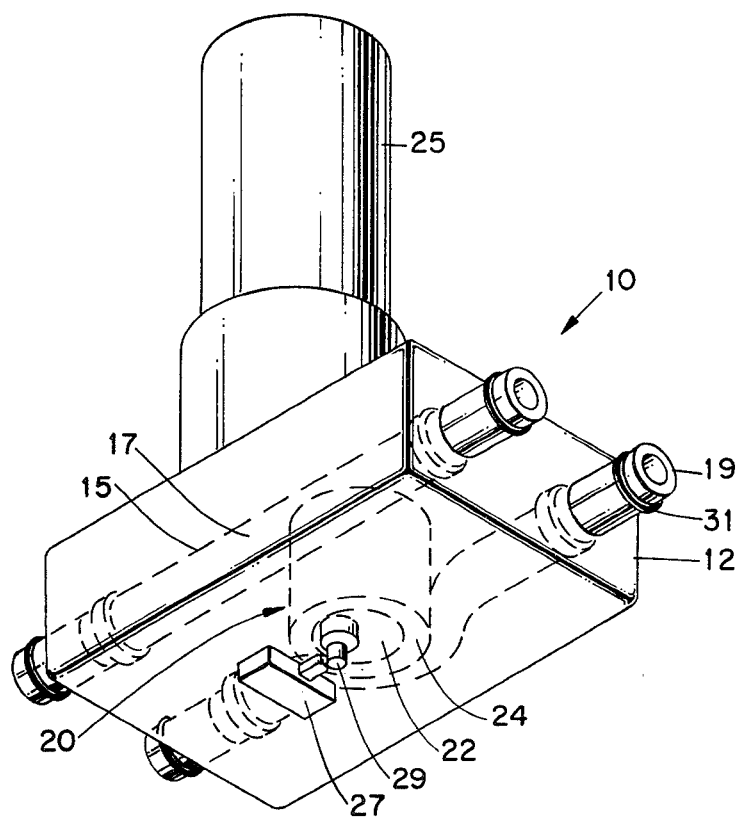
FIG. 1 is a perspective view of a valve in accordance with the present invention.

The pinch valve of the present invention can be better understood by a review of the drawings wherein in FIG. 1 the valve 10 is formed of a valve body 12. The valve body has at least one passage 15 for the placement of at least one flexible tubing 17 which preferably has connectors 19 made of a non-flexible material such as polycarbonate. In a preferred embodiment, the valve body is made of two pieces to aid in placment of the flexible tubing.

Located adjacent the flexible tubing is an eccentric 20 having an interior valve eccentric 22 and a shut-off eccentric sleeve 24. The valve eccentric is attached to motor 25 which upon operation will cause the eccentric to rotate and permit pinching off or restriction of flow through the flexible tubing.

In a preferred embodiment the valve also contains one or more valve microswitches 27 which permit the operator to monitor the positions of the eccentric (and accordingly the flow therethrough) in the valve.

The valve also can contain a switch actuation pin 29 that comes into contact with the microswitch 27. The microswitch makes it possible to record the position of the switch actuation pin and therefore lets the operator know the degree of pinching that has occurred. During operation of the valve it is preferred that the flexible tube be compressed over the connectors by each piece of the valve body to prevent leakage at high pressure.

The pinch valve can be used in any environment where a pinch valve needs to be used but has particular applications in the manifold system disclosed in U.S. application Ser. No. 535,355, contemporaneously filed in the names Jacobsen and Hanover.

In the pinch valve of the present invention, the flexible tube is made of Silastic TM (Dow-Corning) elastomer. When the pinch valve is in a negative pressure valve configuration, i.e., when the valve contains one flexible tube and one glass tube, the glass tube is formed of borosilicate glass available from the Richmond Glass Comp. Inc., Oak & Tuckahoe Roads, Richland, N.J. 08350. The glass tube is made to provide approximately a 400 mm Hg pressure drop at a flow rate of 250 ml/min.

The valve body is made of any durable material but preferably is formed of a white acrylonitrile-butadiene-styrene (ABS) resin. For the embodiment depicted in the drawing, the valve body was taken from a mold designed by SARCOS personnel and made by A-Qua-Molds, 6110 Sierra Grande Drive, Benmon, Utah 84118. Injection molding of the valve body was performed by Willow Tech., Inc., 6864 S. 300 W., Midvale, Utah 84047.

The valve eccentric is made of material Delrin ® (duPont), a polyvinyl acetal resin characterized by its hardness, resistance to wear, and low friction. The sleeve for the valve eccentric is formed of a molybdenum disulfide-impregnated nylon known as Nylatron available from Commercial Plastics, 2340 S.W. Temple, Salt Lake City, Utah. Machining was performed by the Norman Co., 312 W. 800 So., Salt Lake City, Utah.

The valve microswitches are Model V4T7 available from Burgess Switch Co., 638 Anthony Trail, Northbrook, Ill. 60062.

It is desirable for the connector to have an O-ring 31 since this permits for proper sealing engagement with elements of the system in which the valve is used. An example of such a system is the plug-in manifolding system described in Jacobsen et al, U.S. patent application Ser. No. 535,355, filed Sept. 23, 1983 mentioned previously.

Figure 2:
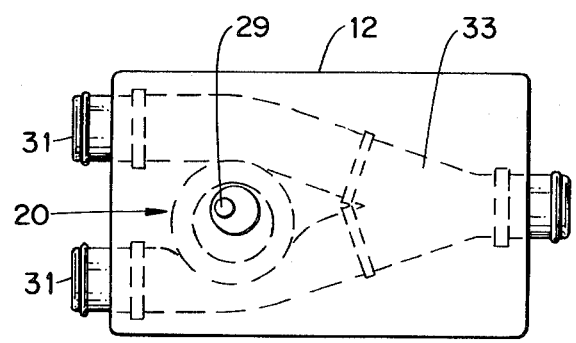
FIG. 2 is a bottom view of an embodiment of the present invention where two flexible tubes are connected by an internal Y-connector.

In FIG. 2, there is shown a pressure- or flow-regulating valve having two flexible tubes 31 which are connected by an internal Y-connector 33. The eccentric cam 20 is so placed in the valve body to permit regulation of the flow.

Figure 3:
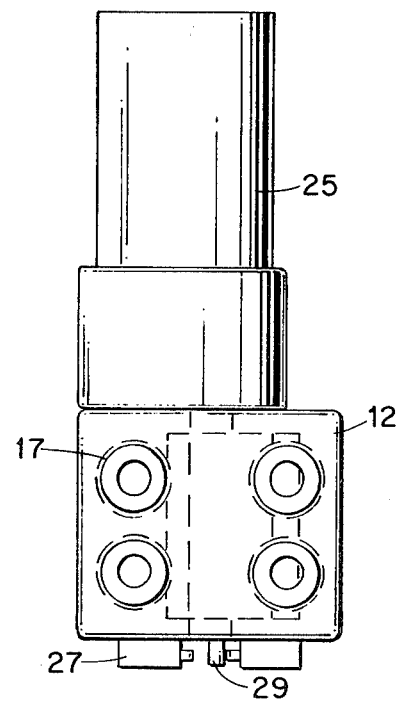
FIG. 3 is a side view of the valve of the present invention in a multi-planar configuration.

In FIG. 3, the eccentric cam attached to the motor is able to regulate the flow through a plurality of tubes 17. At least one of the tubes should be flexible and of course it is possible that all four of the tubes depicted in FIG. 4 can be flexible. As in the embodiment shown in FIG. 1, the valve contains two microswitches 27 which are activated by a switch actuation pin 29 present on the eccentric cam which also contains a sleeve.

What is claimed is:

1. A pinch-type shut-off, pressure- or flow-regulating valve comprising:
    a valve body having at least one hole therethrough for placement of tubing,
    a flexible tube located in said at least one tube in said valve body,
    an eccentric including a substantially cylindrically shaped body, said eccentric located in said valve body and adjacent said flexible tube, a shaft projecting from one side of said cylindrically shaped body, said shaft being offset from the center of said cylindrically shaped body,
    a motor attached to said shaft, whereupon activation of said motor, said eccentric will move to pinch off said flexible tube by pressing said tube against the opposite side of said valve body, said eccentric further including a round rigid sleeve freely rotatably received about the outer curved portion of said cylindrically shaped body as said cylindrically shaped body rotates, and said sleeve directly engaging said tube, whereby longitudinal stress on said tube from said eccentric is substantially alleviated.
2. The valve of claim 1 wherein said valve body has at least two holes, each hole containing a flexible tube.
3. The valve of claim 2 wherein said at least two flexible tubes are made of silicone elastomer.
4. The valve of claim 3 wherein said at least two flexible tubes contain at their ends a connector of non-flexible material.
5. The valve of claim 3 wherein said two flexible tubes are connected by an internal Y-connector.
6. The valve of claim 3 comprising a series of flexible tubes in multiplanar configuration.
7. The valve of claim 3 wherein a switch is located adjacent the outer portion of said flexible tubes for engagement with said switch actuation pin on said eccentric.
8. The valve of claim 1 wherein said eccentric has a switch actuation pin and said valve further comprises a switch to record the position of said actuation pin.
9. The valve of claim 1 wherein said valve body is a one-piece valve body.
10. The valve of claim 1 wherein said valve body is a two-piece valve body.
11. The valve of claim 10 wherein said flexible tube is compressed over said eccentric by each piece of the valve body to prevent leakage at high pressure.
12. The valve of claim 1 wherein said flexible tube is made of silicone elastomer.
13. The valve of claim 12 wherein said flexible tube contains at its end a connector of non-flexible material.
14. The valve of claim 1 wherein said motor is a DC motor.
15. The valve of claim 1 wherein said motor is an AC motor.
16. The valve of claim 1 wherein said motor is a stepping motor.
17. The valve of claim 1 wherein said sleeve is formed of a molybdenum disulfide-filled polyamide.

* * * * *